US012585047B2

(12) United States Patent
Sugata et al.

(10) Patent No.: US 12,585,047 B2
(45) Date of Patent: Mar. 24, 2026

(54) ANTI-REFLECTION STRUCTURE, BASE MATERIAL WITH ANTI-REFLECTION STRUCTURE, CAMERA MODULE AND INFORMATION TERMINAL DEVICE

(71) Applicant: Dexerials Corporation, Shimotsuke (JP)

(72) Inventors: Hiroshi Sugata, Shimotsuke (JP); Hiroshi Tazawa, Shimotsuke (JP); Shunichi Kajiya, Shimotsuke (JP)

(73) Assignee: Dexerials Corporation, Shimotsuke (JP)

( * ) Notice: Subject to any disclaimer, the term of this patent is extended or adjusted under 35 U.S.C. 154(b) by 758 days.

(21) Appl. No.: 17/754,144

(22) PCT Filed: Sep. 23, 2020

(86) PCT No.: PCT/JP2020/035799
§ 371 (c)(1),
(2) Date: Mar. 25, 2022

(87) PCT Pub. No.: WO2021/060275
PCT Pub. Date: Apr. 1, 2021

(65) Prior Publication Data
US 2022/0291422 A1 Sep. 15, 2022

(30) Foreign Application Priority Data
Sep. 27, 2019 (JP) ................................ 2019-177159

(51) Int. Cl.
*G02B 5/02* (2006.01)
*G02B 1/11* (2015.01)
*G02B 1/118* (2015.01)

(52) U.S. Cl.
CPC ................ *G02B 1/118* (2013.01); *G02B 1/11* (2013.01); *G02B 5/0294* (2013.01)

(58) Field of Classification Search
CPC .......... G02B 1/00; G02B 1/041; G02B 1/045; G02B 1/10; G02B 1/11; G02B 1/111;
(Continued)

(56) References Cited

U.S. PATENT DOCUMENTS

2007/0100060 A1* 5/2007 Tahri ...................... G10K 11/16
524/502
2015/0248182 A1* 9/2015 Hsu .......................... G06F 3/041
428/408
(Continued)

FOREIGN PATENT DOCUMENTS

CN 105377542 A 3/2016
JP 2009229507 A 10/2009
(Continued)

OTHER PUBLICATIONS

Apr. 14, 2023, Office Action issued by the Korean Intellectual Property Office in the corresponding Korean Patent Application No. 10-2022-7006962.
(Continued)

*Primary Examiner* — Thong Q Nguyen
(74) *Attorney, Agent, or Firm* — KENJA IP LAW PC

(57) ABSTRACT

Provided is an anti-reflection structure with excellent anti-reflection performance and transparency, and with reduced generation of wrinkles on the surface. The present disclosure is an anti-reflection structure 10 including at least an adhesion layer 20 and an anti-reflection layer 30 formed on the adhesion layer 20 and having fine uneven structures on both sides thereof. The storage elastic modulus E' of the adhesion layer 20 is equal to or greater than 25 MPa, and fine uneven structures formed on both sides of the anti-reflection layer 30 each have an uneven period P equal to or less than the wavelength of visible light.

5 Claims, 5 Drawing Sheets

(58) Field of Classification Search
CPC ......... G02B 1/113; G02B 1/115; G02B 1/118;
G02B 1/12; G02B 1/14; G02B 1/18;
G02B 5/00; G02B 5/003; G02B 5/02;
G02B 5/021; G02B 5/0221; G02B
5/0231; G02B 5/0247; G02B 5/0273;
G02B 5/0278; G02B 5/0289; G02B
5/0294; G02B 5/04
USPC .................................. 359/577–614, 350–361
See application file for complete search history.

(56) References Cited

U.S. PATENT DOCUMENTS

| | | | |
|---|---|---|---|
| 2016/0082688 A1 | 3/2016 | Nakai et al. | |
| 2018/0166383 A1* | 6/2018 | Cao .................... | H01L 23/5329 |
| 2019/0167714 A1* | 6/2019 | Brown ................. | A61L 27/446 |

FOREIGN PATENT DOCUMENTS

| | | |
|---|---|---|
| JP | 5652516 B1 | 1/2015 |
| JP | 2015022108 A | 2/2015 |
| JP | 2019015965 A | 1/2019 |
| JP | 2019084753 A | 6/2019 |
| KR | 20170004137 A * | 1/2017 |
| WO | 2013187349 A1 | 12/2013 |
| WO | 2014163198 A1 | 10/2014 |

OTHER PUBLICATIONS

May 16, 2023, Notification of Reasons for Refusal issued by the Japan Patent Office in the corresponding Japanese Patent Application No. 2019-177159.
Dec. 1, 2020, International Search Report issued in the International Patent Application No. PCT/JP2020/035799.
Aug. 30, 2023, the Extended European Search Report issued by the European Patent Office in the corresponding European Patent Application No. 20869989.2.
Mar. 15, 2022, International Preliminary Report on Patentability issued in the International Patent Application No. PCT/JP2020/035799.
Feb. 28, 2023, Notification of Reasons for Refusal issued by the Japan Patent Office in the corresponding Japanese Patent Application No. 2019-177159.
Oct. 28, 2023, Office Action issued by the China National Intellectual Property Administration in the corresponding Chinese Patent Application No. 202080065634.9.
Mar. 26, 2024, Office Action issued by the China National Intellectual Property Administration in the corresponding Chinese Patent Application No. 202080065634.9.

* cited by examiner

*FIG.* 4(a)
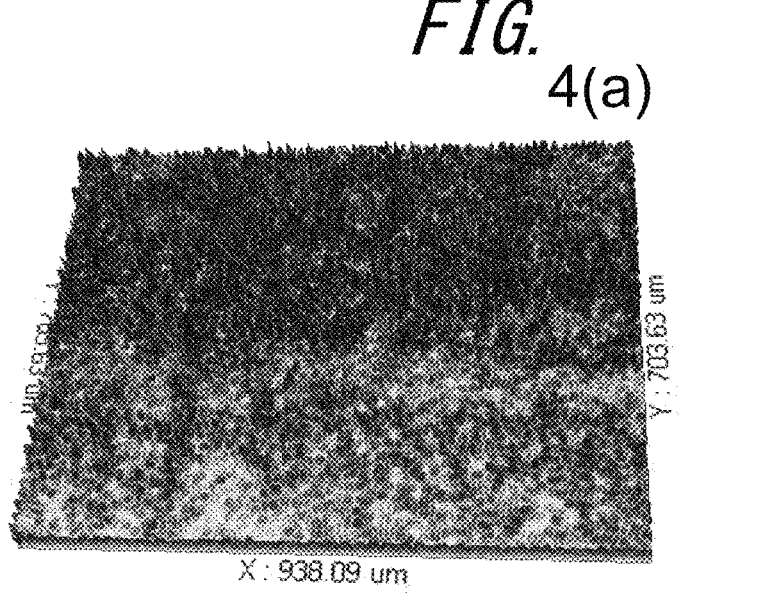
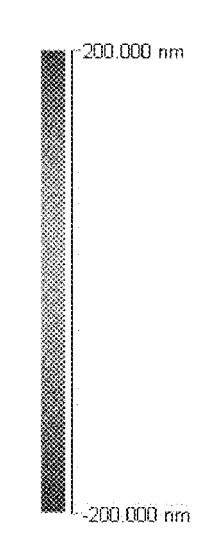
*FIG.* 4(b)
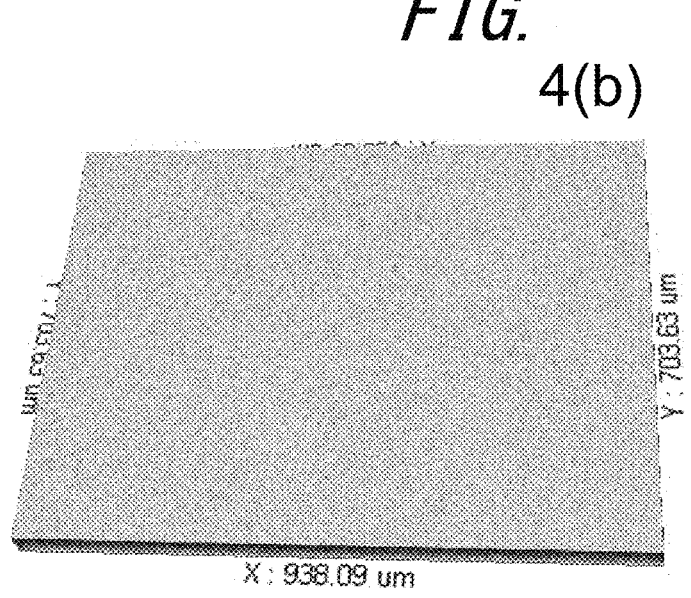
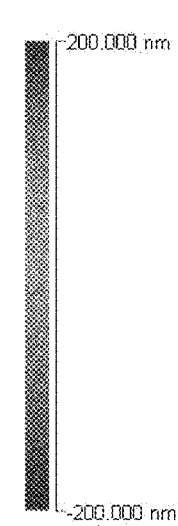

ANTI-REFLECTION STRUCTURE, BASE MATERIAL WITH ANTI-REFLECTION STRUCTURE, CAMERA MODULE AND INFORMATION TERMINAL DEVICE

TECHNICAL FIELD

The present disclosure relates to an anti-reflection structure and a base material with anti-reflection structure with excellent anti-reflection performance and transparency, and with reduced generation of wrinkles on the surface, a camera module with excellent anti-reflection performance and transparency, and an information terminal device that can obtain captured images with excellent visibility and image quality.

BACKGROUND

A display device such as a liquid crystal display or an optical device such as a camera is often subjected to anti-reflection treatment such as formation of an anti-reflection layer on an incident surface of light of a base material such as a display plate or a lens to avoid deterioration of visibility and image quality (generation of color unevenness, ghost, or the like) due to reflection of light from the outside.

Here, as one of existing anti-reflection treatments, a technique of forming an anti-reflection layer having a fine uneven structure (moth-eye structure) on a light incident surface so as to reduce reflectance is known.

As a technique of forming a thin film having a fine uneven structure, for example, Patent Literature (PTL) 1 discloses a technique related to a transfer body, which aims to impart a function on a workpiece with high precision by forming a carrier (10) with a nano-structured uneven structure (11) and a functional layer (12) provided on the uneven structure (11) by transfer and optimizing the average pitch of the formed uneven structure and the conditions of the functional layer.

CITATION LIST

Patent Literature

PTL 1: WO2013187349 (A1)

SUMMARY

Technical Problem

Generation of wrinkles on the surface of the structure on which the thin film body is formed not only deteriorate the appearance, but also adversely affect the anti-reflection performance and transparency. Therefore, development of a technique that can suppress the generation of wrinkles has been desired.

The present disclosure has been made in light of the circumstances described above, and an object of the disclosure is to provide an anti-reflection structure and a base material with anti-reflection structure with excellent anti-reflection performance and transparency, and with reduced generation of wrinkles on the surface. Further, another object of the present disclosure is to provide a camera module with excellent anti-reflection performance and transparency, and an information terminal device that can obtain captured images with excellent visibility and image quality.

Solution to Problem

In order to solve the above described problem, the inventors of the present disclosure made an intensive research on an anti-reflection structure including at least an adhesion layer and an anti-reflection layer formed on the adhesion layer and having fine uneven structures on both sides thereof, and found the followings: when an anti-reflection layer having a fine uneven structure is transfer molded, even if the internal stress of the formed anti-reflection layer is kept high, generation of wrinkles on the surface of the anti-reflection structure can be effectively suppressed, and the anti-reflection performance and the transparency of the light can be maintained well by optimizing the storage elastic modulus of the adhesion layer; and the anti-reflection performance can be improved by setting the uneven period of each fine uneven structure formed on both sides of the anti-reflection layer to be equal to or less than the wavelength of visible light. Then the inventors have completed the present disclosure.

The present disclosure is made on the basis of the above described findings, and is summarized below.

(1) An anti-reflection structure including at least an adhesion layer and an anti-reflection layer formed on the adhesion layer and having fine uneven structures on both sides thereof, wherein a storage elastic modulus of the adhesion layer is equal to or greater than 25 MPa (MegaPascal); and the fine uneven structures formed on both sides of the anti-reflection layer each have an uneven period equal to or less than the wavelength of visible light.

With the above configuration, the anti-reflection performance and the transparency of the anti-reflection structure are improved, and wrinkle generation on the surface can be reduced.

(2) The anti-reflection structure according to (1) above, wherein the storage elastic modulus of the adhesion layer is equal to or greater than 25 MPa (MegaPascal) and equal to or less than 2.1 GPa (GigaPascal).

(3) The anti-reflection structure according to (1) or (2) above, wherein the adhesion layer is a layer made of ultraviolet curable adhesive.

(4) The anti-reflection structure according to any one of (1) to (3) above, wherein a thickness of the adhesion layer relative to the thickness of the anti-reflection layer is from 5 to 300.

(5) A base material with anti-reflection structure including a base material, an adhesion layer formed on the base material, and an anti-reflection layer formed on the adhesion layer and having fine uneven structures on both sides thereof, wherein a storage elastic modulus of the adhesion layer is equal to or greater than 25 MPa (MegaPascal); and the fine uneven structures formed on both sides of the anti-reflection layer each have an uneven period equal to or less than the wavelength of visible light.

With the above configuration, the anti-reflection performance and the transparency of the base material with anti-reflection structure are improved, and wrinkle generation on the surface can be reduced.

(6) A camera module using the base material with anti-reflection structure according to (5) above.

(7) An information terminal device equipped with a camera module, wherein, as the camera module, the camera module according to (6) is used.

With this configuration, a captured image with excellent visibility and image quality can be obtained.

Advantageous Effect

According to the present disclosure, an anti-reflection structure and a base material with anti-reflection structure with excellent anti-reflection performance and transparency, and with reduced generation of wrinkles on the surface can be provided. Further, according to the present disclosure, by using the base material with anti-reflection structure, a camera module with excellent anti-reflection performance and transparency, and an information terminal device that can obtain captured images with excellent visibility and image quality can be provided.

BRIEF DESCRIPTION OF THE DRAWINGS

In the accompanying drawings:

FIG. 4 is a diagram illustrating the surface state of the anti-reflection structure with wrinkles and without wrinkles observed with a three-dimensional shape measuring instrument, in which (a) is a surface state of the anti-reflection structure with wrinkles and (b) is a surface state of the anti-reflection structure without wrinkles.

DETAILED DESCRIPTION

An example of an embodiment of the present disclosure will be illustrated in detail below with reference to the drawings as necessary. Each member disclosed in FIGS. 1, 2 and 5 may be schematically represented by a scale or a shape different from the actual ones for convenience of explanation.

<Anti-Reflection Structure>

First, an embodiment of an anti-reflection structure according to the present disclosure will be explained.

Figure 1:
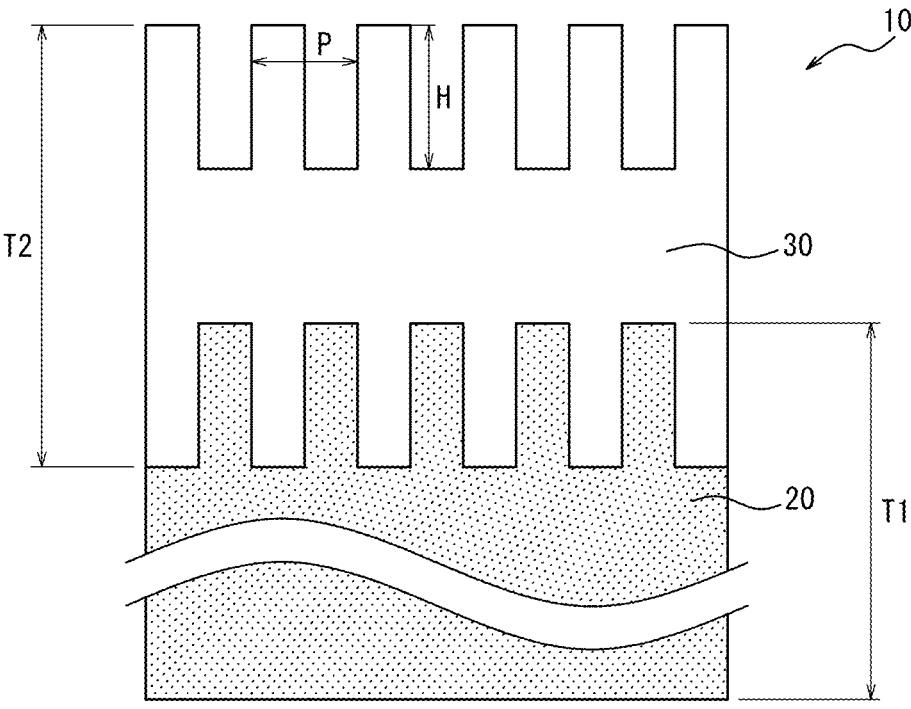
FIG. 1 is a cross-sectional view schematically illustrating an embodiment of an anti-reflection structure according to the present disclosure.

As illustrated in FIG. 1, the anti-reflection structure according to the present disclosure is an anti-reflection structure 10 including at least an adhesion layer 20 and an anti-reflection layer 30 formed on the adhesion layer 20 and having fine uneven structures on both sides thereof.

Then, in the anti-reflection structure 10 according to the present disclosure, the storage elastic modulus of the adhesion layer 20 is equal to or greater than 25 MPa, and fine uneven structures formed on both sides of the anti-reflection layer 30 each have an uneven period equal to or less than the wavelength of visible light.

A high anti-reflection performance can be realized while thinning is achieved by setting an uneven period P of the fine uneven structure of the anti-reflection layer 30 to be equal to or less than the wavelength of visible light.

Moreover, when the storage elastic modulus of the adhesion layer 20 is increased to be equal to or greater than 25

MPa, even if the anti-reflection layer 30 having a fine uneven structure is transfer molded and an internal stress is present in the formed anti-reflection layer 30 in a high state, the reinforcing property of the adhesion layer 20 is increased, then generation of deformation caused by the internal stress of the anti-reflection layer 30 can be suppressed. As a result, generation of wrinkles on the surface of the anti-reflection structure 10 can be effectively suppressed. Therefore, the appearance, the anti-reflection performance and the transparency of the anti-reflection structure 10 can be maintained at a high level.

Figure 3:
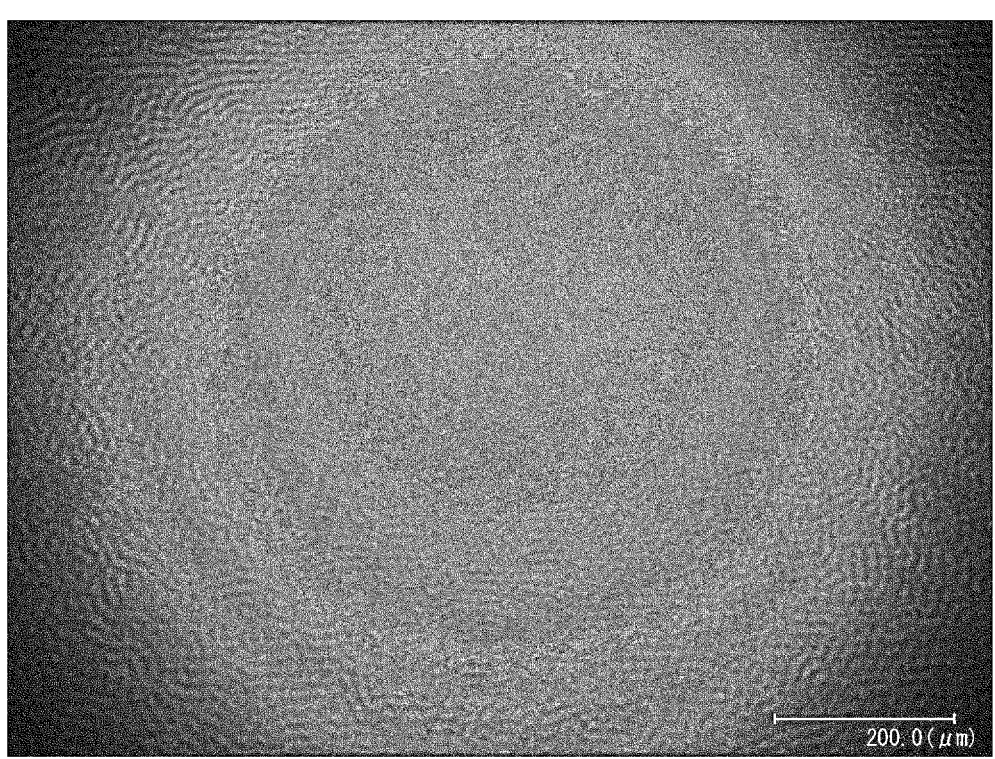
FIG. 3 is an image of a surface of the anti-reflection structure with wrinkles observed with an optical microscope.
Figure 5A:
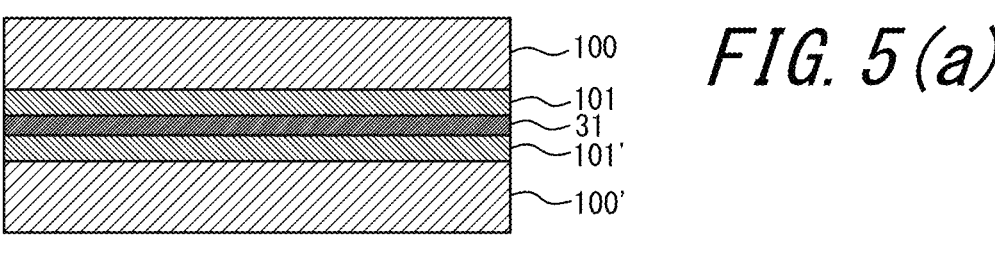
FIG. 5 is a flow diagram illustrating an example of a method of producing the anti-reflection structure and the base material with anti-reflection structure according to the present disclosure, in which (a) illustrates a state where the anti-reflection layer is molded by molds, (b) illustrates a step of crimping one surface of an exposed anti-reflection layer to an adhesion layer provided on the base material, (c) illustrates a step of irradiating energy rays with the anti-reflection layer and the adhesive crimped to each other; and (d) illustrates a step of removing molds and unnecessary anti-reflection layer after the adhesive is cured.
Figure 5B:
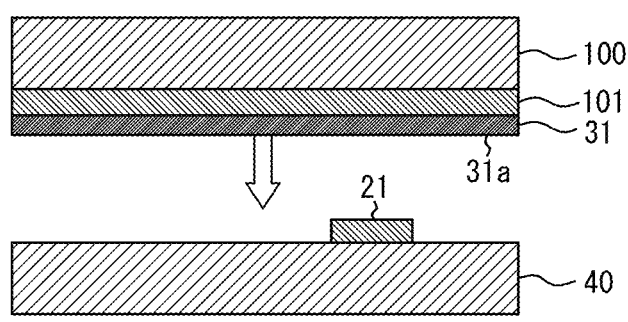
Figure 5C:
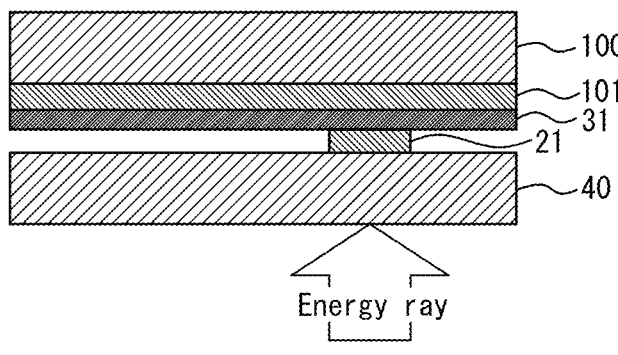
Figure 5D:
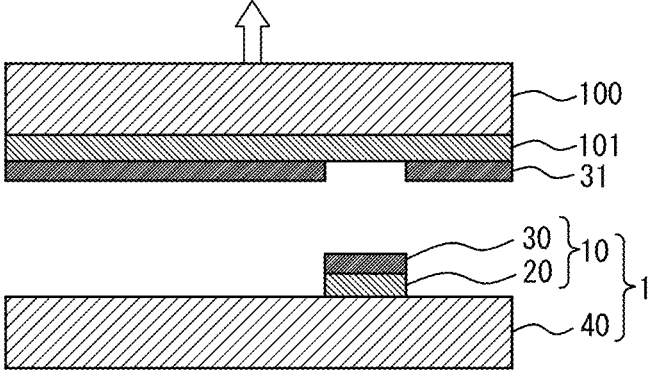

Here, FIG. 3 illustrates an example of the state of wrinkles on the surface of the anti-reflection structure caused by the internal stress of the anti-reflection layer. Generation of such wrinkles may not only impair the appearance of the anti-reflection structure, but also cause deterioration of the anti-reflection performance and the transparency.

In the anti-reflection structure 10 according to the present disclosure, such generation of wrinkles can be suppressed, and a smooth surface state can be obtained. As a result, both the anti-reflection performance and the transparency can be achieved at a high level.

Further, (a) and (b) of FIG. 4 are diagrams of the surface state of the anti-reflection structure observed by a three-dimensional shape measuring instrument ("Vertscan" from Hitachi High-Tech Science Corporation).

In the existing anti-reflection structure, as illustrated in (a) of FIG. 4, it can be seen that wrinkle generation causes unevenness on the surface, which leads to deterioration of anti-reflection performance or reduction in transparency. In contrast, in the anti-reflection structure according to the present disclosure, as illustrated in (b) of FIG. 4, no wrinkle generated on the surface and a smooth surface is obtained.

(Adhesion Layer)

As illustrated in FIG. 1, the anti-reflection structure 10 according to the present disclosure includes the adhesion layer 20.

Then, in the anti-reflection structure 10 according to the present disclosure, from the viewpoint of suppressing generation of wrinkles on the surface, the storage elastic modulus (E') of the adhesion layer 20 is required to be equal to or greater than 25 MPa.

When the storage elastic modulus E' of the adhesion layer 20 is less than 25 MPa, the reinforcing property of the adhesion layer 20 is reduced, and the generation of wrinkles caused by the internal stress retained by the anti-reflection layer 30 described below cannot be sufficiently suppressed.

From the same viewpoint, the storage elastic modulus E' of the adhesion layer 20 is preferably equal to or greater than 60 MPa, and more preferably equal to or greater than 120 MPa.

The storage elastic modulus E' can be measured using a dynamic viscoelastic apparatus (e.g., "DMS6100" from Hitachi High-Tech Science Corporation, etc.) under the following conditions: frequency: 1 Hz, tension/compression force: 98 mN, temperature range: −50 to 200° C., measurement temperature: 40° C., etc.

Further, the storage elastic modulus E' of the adhesion layer 20 is preferably equal to or less than 2.1 GPa, and more preferably equal to or less than 1 GPa, from the viewpoint of ensuring appropriate elasticity and adhesion to the anti-reflection layer 30 and the base material 40.

It is to be noted that the method of adjusting the storage elastic modulus E' of the adhesion layer 20 is not particularly limited, and its adjustment can be appropriately made by a known technique. For example, the desired storage elastic modulus E' can be obtained by adjusting the type of resin that constitutes the adhesive layer 20, the type of monomers and oligomers, the type and content of polymerization initiators and additives, and when ultraviolet curable resin is used as a material, the irradiation time of UV light.

Here, the adhesion layer 20 is made of an adhesive to bond the anti-reflection layer 30 described below to the other members such as the base material 40 described below. It is necessary to use a material that does not deteriorate the anti-reflection performance of the anti-reflection structure 30 and has a high storage elastic modulus E' (equal to or greater than 25 MPa).

Specific materials are not particularly limited, and in the viewpoint of obtaining a high storage elastic modulus E' and manufacturability, resin compositions which are cured by a curing reaction can be used as appropriate. Among them, the adhesive layer 20 is preferably made of an ultraviolet curable adhesive so as to realize high bonding property and a high storage elastic modulus E'. Examples of the ultraviolet curable resin include an ultraviolet curable acrylic resin, an ultraviolet curable epoxy resin, and the like.

The method of forming the adhesion layer is not particularly limited. For example, when the adhesion layer 20 is a layer made of an ultraviolet curable adhesive, the adhesion layer 20 can be formed by irradiating ultraviolet rays in a state where the ultraviolet curable adhesive is crimped to the anti-reflection layer 30 described below.

Further, for the shape of the adhesion layer 20, at least the side in contact with the anti-reflection layer 30 has a fine uneven structure as illustrated in FIG. 1. The fine uneven structure of the adhesion layer 20 is formed corresponding to the fine uneven structure of the anti-reflection layer 30 described below, and thus the conditions of uneven pitch, uneven height, and the like, are the same as those explained with respect to the anti-reflection layer 30 described below.

The surface of the adhesive layer 20 opposite to the surface in contact with the anti-reflection layer 30 is usually flat. However, it can be appropriately changed depending on the surface shape of the base material 40 in contact with the adhesive layer 20.

Moreover, in terms of thinning the anti-reflection structure 10, the thickness T1 of the adhesion layer 20 is preferably thinned. Specifically, it is preferable to be equal to or less than 30 and more preferable to be equal to or less than 10 μm.

In addition, in terms of more reliable suppression of generation of wrinkles of the anti-reflection structure 10, the thickness T1 of the adhesion layer 20 is preferably equal to or greater than 1 and more preferably equal to or greater than 5 μm.

Furthermore, the ratio of the thickness T1 of the adhesion layer 20 to the thickness T2 of the anti-reflection layer 30 described below (T1/T2) is preferably in the range of 5 to 300, more preferably in the range of 25 to 120. When the T1/T2 ratio is 5 or more, generation of wrinkles of the anti-reflection structure 10 can be suppressed more reliably. In contrast, when the T1/T2 ratio is 300 or less, the thin film property and the anti-reflection performance can be maintained better.

The thickness T1 of the adhesion layer 20 and the thickness T2 of the anti-reflection layer 30 are the thicknesses T1 and T2 of the thickest portion in the laminating direction, respectively, as illustrated in FIG. 1.

(Anti-Reflection Layer)

The anti-reflection structure 10 according to the present disclosure further includes the anti-reflection layer 30 formed on the adhesion layer 20 and having a fine uneven structure (moth-eye structure) on both sides thereof, as illustrated in FIG. 1.

Further, since the anti-reflection layer 30 has a fine uneven structure, generation of reflected light can be suppressed, and the anti-reflection performance of the anti-reflection structure 10 can be improved.

Conditions of each projection and each recess of the fine uneven structure of the anti-reflection structure 30 are not particularly limited. For example, as illustrated in FIG. 1, they may be periodically disposed (e.g., staggered lattice shape, rectangular lattice shape), and may also be disposed randomly. Furthermore, the shapes of the projection and the recess are not particularly limited, and may be artillery, conical, columnar, or needle shaped and the like. It is to be noted that the shape of the recess means a shape formed by the inner wall of the recess.

The fine uneven structures formed on both sides of the anti-reflection layer 30 each have an uneven period (uneven pitch) P that is equal to or less than the wavelength of visible light (e.g., 830 nm or less). The uneven period P of the fine uneven structure is set to not more than the visible light wavelength, in other words, the fine uneven structure is formed in what is called a "moth-eye structure," and as a result generation of reflected light in the visible light region is suppressed, and an excellent anti-reflection performance can be realized.

Further, in terms of more reliable suppression of the reflected light of the visible light, the upper limit of the uneven period P is preferably equal to or less than 350 nm and more preferably equal to or less than 280 nm, and in terms of manufacturability and more reliable suppression of the reflected light of visible light, the lower limit of the uneven period P is preferably equal to or greater than 100 nm, and more preferably equal to or greater than 150 nm.

The uneven periods P of the fine uneven structures formed on both sides of the anti-reflection layer 30 are an arithmetic mean value of the distances between adjacent protrusions and adjacent recesses. The uneven periods P of the fine uneven structures can be observed, for example, using a scanning electron microscope (SEM) or a cross-section transmission electron microscope (cross-section TEM) and the like.

Further, the method by which the arithmetic mean value between adjacent protrusions and adjacent recesses is calculated may, for example, be a method in which a plurality of combinations of adjacent protrusions and a plurality of combinations of adjacent recesses are selected, the distances between the protrusions and the distances between the recesses in these combinations are measured, and the measured values are averaged.

The periods P of the fine uneven structures formed on both sides of the anti-reflection layer 30 may be the same period P as illustrated in FIG. 1 or different period. However, even if the period P of fine uneven structure is different for each surface, it is necessary that the period P is equal to or less than the wavelength of visible light.

Further, the average uneven height (the depth of recess) H of the fine uneven structure may preferably be equal to or greater than 190 nm so as to obtain an excellent anti-reflection performance in more reliable manner. Further, the average uneven height H of the fine uneven structure may preferably be equal to or less than 320 nm in terms of thinning of the laminate.

The uneven height H of the fine uneven structure is a distance from the bottom of the recess to the vertex of the protrusion, as illustrated in FIG. 1, and the average uneven height can be obtained by measuring some uneven heights H (e.g., five portions) and averaging them.

Further, the thickness of the support portion under the fine uneven structure of the anti-reflection structure 30 where the fine uneven structure is not formed is not particularly limited, and may be about from 10 nm to 9000 nm.

Further, the material of the anti-reflection layer 30 is not particularly limited. Examples of the material include, for example, a resin composition that is cured by a curing reaction, such as an active energy ray curable resin composition (photocurable resin composition, electron beam curable resin composition), thermosetting resin composition, or the like, and for example, a resin composition containing a polymerizable compound and a polymerization initiator.

As the polymerizable compound, for example, (i) an esterified product obtained by reacting (meth)acrylic acid or a derivative thereof in a ratio of equal to or greater than 2 mol to 1 mol of polyhydric alcohol, (ii) an esterified product obtained by a polyhydric alcohol, a polyvalent carboxylic acid or an anhydride thereof, an (meth)acrylic acid or a derivative thereof, and the like can be used.

Examples of the above described (i) include 1,4-butanediol di(meth)acrylate, 1,6-hexanediol di(meth)acrylate, 1,9-nonanediol di(meth)acrylate, trimethylol propantri(meth)acrylate, trimethylol ethantri(meth)acrylate, pentaerythritol tri(meth)acrylate, pentaerythritol tetra(meth)acrylate, tetrahydrofuryl acrylate, glycerin tri(meth)acrylate, dipentaerythritol penta(meth)acrylate, dipentaerythritol hexa(meth)acrylate, tripentaerythritol hexa(meth)acrylate, tripentaerythritol hepta(meth)acrylate, acryloimonofoline, urethane acrylate, and the like.

Examples of the above described (ii) include polyhydric alcohols such as trimethylolethane, trimethylolpropane, glycerin, and pentaerythritol; polycarboxylic acids or anhydrides thereof selected from malonic acid, succinic acid, adipic acid, glutaric acid, sebacic acid, fumaric acid, itaconic acid, maleic anhydride, and the like; and esterified products obtained by reacting (meth)acrylic acid or derivatives thereof.

These polymerizable compounds may be used alone or two or more types may be used in combination.

Furthermore, when the resin composition is photocurable, examples of photopolymerization initiators include, for example: carbonyl compounds such as benzoin, benzoin methyl ether, benzoin ethyl ether, benzoin isopropyl ether, benzoin isobutyl ether, benzyl, benzophenone, p-methoxybenzophenone, 2,2-diethoxyacetophenone, α, α-dimethoxy-α-phenylacetophenone, methylphenylglyoxylate, ethylphenylglyoxylate, 4,4'-bis(dimethylamino)benzophenone, 1-hydroxycyclohexyl phenyl ketone, 2-hydroxy-2-methyl-1-phenyl-propan-1-one, and the like; sulfur compounds such as tetramethylthiuram monosulphide, tetramethylthiuram disulfide, and the like; 2,4,6-trimethylbenzoyl diphenylphosphine oxide, benzoyl diethoxyphosphine oxide; and the like. One or more of these can be used.

When the resin composition is electron beam curable, examples of the electron beam polymerization initiator include: thioxanthones such as benzophenone, 4,4-bis(diethylamino)benzophenone, 2,4,6-trimethylbenzophenone, methylorthobenzoylbenzoate, 4-phenylbenzophenone, t-butylanthraquinone, 2-ethylanthraquinone, 2,4-diethylthioxanthone, isopropylthioxanthone, 2,4-dichlorothioxanthone, and the like; acetophenones such as diethoxyacetophenone, 2-hydroxy-2-methyl-1-phenylpro pane-1-one, benzyl dimethyl ketal, 1-hydroxycyclohexyl-phenyl ketone, 2-methyl-2-morpholino(4-thiomethylphenyl)propane-1-one, 2-benzyl-2-dimethylamino-1-(4-morpholinophenyl)- butanone; benzoin ethers such as benzoin methyl ether, benzoin ethyl ether, benzoin isopropyl ether, and benzoin isobutyl ether; acylphosphine oxide such as 2,4,6-trimethylbenzoyldiphenylphosphine oxide, bis(2,6-dimethoxybenzoyl)-2,4,4-trimethylpentylphosphine oxide, bis(2,4,6-trimethylbenzoyl)-phenylphosphine oxide, and the like; and methylbenzoyl formate, 1,7-bisacridinylheptane, 9-phenylacrydin, and the like. One or more of these can be used.

When the resin composition is thermosetting, examples of thermal polymerization initiators include: organic peroxides such as methyl ethyl ketone peroxide, benzoyl peroxide, dicumyl peroxide, t-butyl hydroperoxide, cumene hydroperoxide, t-butyl peroxyoctoate, t-butyl peroxybenzoate, lauroyl peroxide, and the like; azo-based compounds such as azobisisobutyronitrile; and redox polymerization initiators obtained by combining amines such as N,N-dimeth ylaniline, N,N-dimethyl-p-toluidine with the above described organic peroxides.

These photopolymerization initiators, electron beam polymerization initiators, and thermal polymerization initiators may be used alone or in combination as desired.

Further, the amount of polymerization initiator is preferably 0.01 to 10 parts by mass with respect to 100 parts by mass of polymerizable compound. In such a range, the curing proceeds sufficiently, the molecular weight of the cured product becomes appropriate, and sufficient strength is obtained, and there is no problem that the cured product is colored due to the residue of the polymerization initiator or the like.

Moreover, the resin composition may contain a non-reactive polymer or an active energy ray sol-gel reactive component, and may contain various additives such as a thickener, a leveling agent, an ultraviolet absorber, a light stabilizer, a thermal stabilizer, a solvent, an inorganic filler, and the like, as necessary.

Further, in terms of thinning the anti-reflection structure 10, the thickness T2 of the anti-reflection layer 30 is preferably thin. Specifically, it is preferable to be equal to or less than 30 μm, and more preferable to be equal to or less than 10 μm.

In addition, in terms of more reliably suppressing generation of wrinkles in the anti-reflection structure 10, the thickness T2 of the anti-reflection layer 30 is preferably equal to or greater than 1 μm, and more preferably equal to or greater than 5 μm.

The method of producing the anti-reflection structure 10 according to the present disclosure is not particularly limited. For example, as illustrated in (a) to (d) of FIG. 5, the anti-reflection structure 10 including the adhesion layer 20 and the anti-reflection layer 30 formed on the adhesion layer 20 and having fine uneven structures on both sides thereof can be obtained through a step of producing the anti-reflection layer 31, a step of crimping the anti-reflection layer 31 to the adhesive 21, a step of irradiating energy rays and a step of removing mold and unnecessary anti-reflection layer.

The step of producing the anti-reflection layer 31 is a step of producing the anti-reflection layer 31 by molding the material of the anti-reflection layer so that it has a fine uneven structure on both sides thereof and then curing the material.

Specifically, as illustrated in (a) of FIG. 5, for example, the material of the anti-reflection layer is pressed from above and below by the molds 100 and 100' so that the material of the anti-reflection layer has fine uneven structures on both sides thereof, and then cured to obtain the anti-reflection layer 31. Further, in the step of pressing the material of the anti-reflection layer from above and below by the molds 100 and 100', the thickness of the finally obtained anti-reflection layer 30 can be adjusted by adjusting the pressure for pressing.

In the step of producing the anti-reflection layer 31, the material of the anti-reflection layer is molded so that it has fine uneven structures on both sides thereof, and after that, the material is cured by irradiating active energy rays such as UV light to obtain the anti-reflection layer 31 having fine uneven structures on both sides thereof. It is to be noted that irradiation of the active energy rays and pressing by the molds 100 and 100' may be performed with the same timing.

Further, in the step of producing the anti-reflection layer 31, in terms of easy peeling of the molds 100 and 100' from the anti-reflection layer 31 thereafter and obtaining more excellent moldability of the anti-reflection layer 31, as illustrated in (a) of FIG. 5, the mold release layers 101 and 101' can be formed between the anti-reflection layer 31 and each of the molds 100 and 100'.

The step of crimping the anti-reflection layer 31 to the adhesive 21 is a step of crimping exposed one side of the anti-reflection layer 31 to the adhesive 21.

Specifically, as illustrated in (b) of FIG. 5, for example, the mold 100' and the mold release layer 101' on one side are removed from the anti-reflection layer 31 produced as described above, and the anti-reflection layer 31 is crimped to the adhesive 21 provided on the base material 40 with only one side 31a of the anti-reflection layer 31 exposed. In this manner, a fine uneven structure can be formed on the surface of the adhesive 21, which will be the adhesion layer 20 later, depending on the fine uneven structure of the anti-reflection layer 31.

The step of irradiating the energy rays is a step of irradiating energy rays with one side of the anti-reflection layer 31 crimped to the adhesive 21.

As illustrated in (c) of FIG. 5, when energy rays are irradiated with one side of the anti-reflection layer 31 crimped to the adhesive 21, the adhesive 21 is cured and the adhesive 21 and the anti-reflection layer 31 can be adhered to each other.

The type of the energy rays can be appropriately selected depending on the type of the adhesive 21, the required adhesive performance, and the like. For example, as the energy rays, the light such as heat and ultraviolet rays can be used.

The step of removing the mold and unnecessary anti-reflection layer is a step of obtaining a desired anti-reflection structure 10 by removing the mold 100 and the unnecessary anti-reflection layer 31 after irradiating the energy rays and adhering the adhesive 21 and the anti-reflection layer 31 to each other ((c) of FIG. 5).

Specifically, as illustrated in (d) of FIG. 5, the mold 100, the mold release layer 101 and the anti-reflection layer 31 (unnecessary anti-reflection layer 31) not adhered to the adhesive 21 (adhesion layer 20) are removed to obtain the anti-reflection structure 10 including the adhesion layer 20 and the anti-reflection layer 30 formed on the adhesion layer 20 and having fine uneven structures on both sides thereof.

Further, the obtained anti-reflection structure 10 can be subsequently subjected to a treatment such as cleaning, if necessary.

<Base Material with Anti-Reflection Structure>

Next, the base material with anti-reflection structure according to the present disclosure will be explained.

Figure 2:
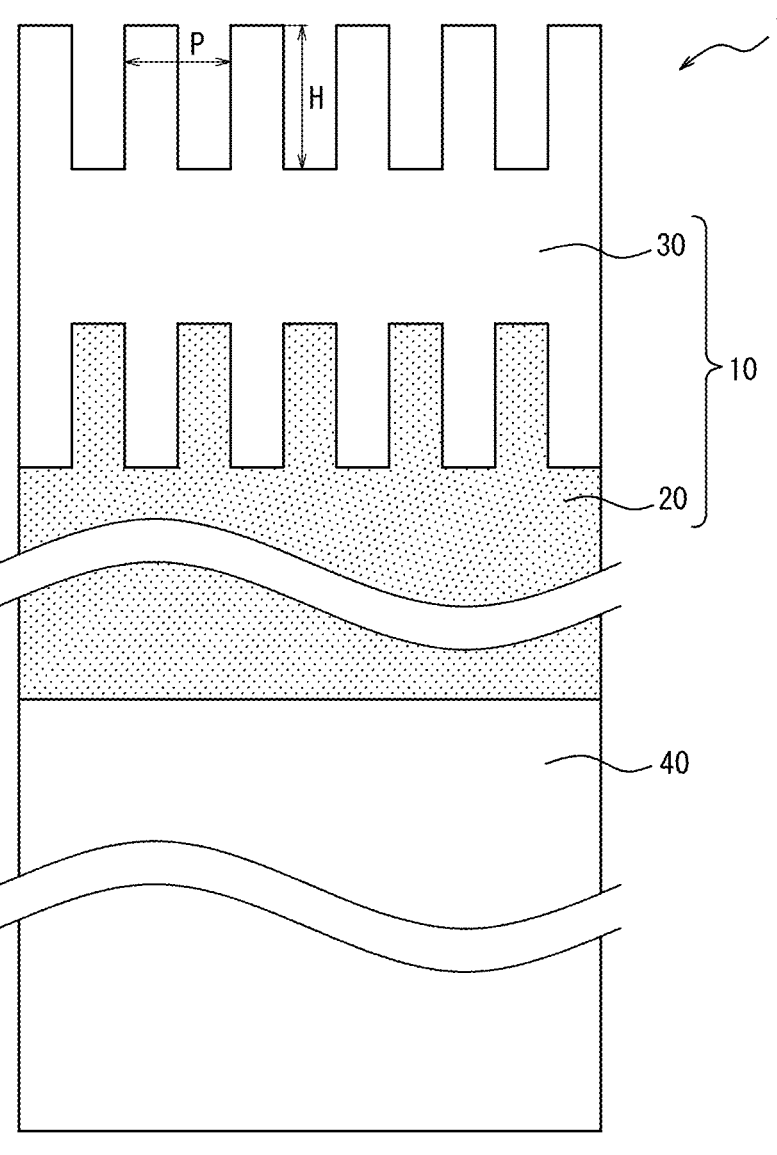
FIG. 2 is a cross-sectional view schematically illustrating an embodiment of a base material with anti-reflection structure according to the present disclosure.

The base material with anti-reflection structure 1 according to the present disclosure includes a base material 40, an adhesion layer 20 formed on the base material 40, and an anti-reflection layer 30 formed on the adhesion layer 20 and having fine uneven structures on both sides thereof, as illustrated in FIG. 2.

Then, in the base material with anti-reflection structure 1 according to the present disclosure, the storage elastic modulus of the adhesion layer 20 is equal to or greater than 25 MPa, and fine uneven structures formed on both sides of the anti-reflection layer 30 each have an uneven period of equal to or less than the wavelength of visible light.

As explained in the anti-reflection structure 10 according to the present disclosure, when the uneven period P of the fine uneven structure 30 of the anti-reflection layer 30 is set to be equal to or less than the wavelength of visible light, a high anti-reflection performance can be realized while thinning is achieved. Further, when the storage elastic modulus of the adhesion layer 20 is set to be equal to or greater than 25 MPa, after the anti-reflection layer 30 having a fine uneven structure is transfer molded, even if the internal stress of the molded anti-reflection layer 30 is present at a high state, the reinforcing property of the adhesion layer 20 is increased, and generation of distortion caused by the internal stress of the anti-reflection layer 30 can be suppressed. As a result, generation of wrinkles on the surface of the anti-reflection structure 10 (eventually the surface of the base material with anti-reflection structure 1) can be effectively suppressed. Thus, the appearance, the anti-reflection performance and the transparency of the base material with anti-reflection structure 1 can be maintained at a high level.

For the anti-reflection structure 10 in the base material with anti-reflection structure 1 according to the present disclosure, it is the same as those explained with respect to the anti-reflection structure 10 according to the present disclosure.

The base material with anti-reflection structure 1 according to the present disclosure includes a base material 40, in addition to the anti-reflection structure 10 described above.

The base material 40 is a member serving as a substrate or a support plate in the base material with anti-reflection structure 1 according to the present disclosure. The materials of the base material 40 are not particularly limited, and can be appropriately selected according to the purpose of use.

For example, the material of the base material 40 may be glass, polymethyl methacrylate (PMMA) or the above described materials whose surface is coated with an organic material (polyimide, etc.), and the like. The display plate may preferably be transparent so as to transmit light, since the display plate is used as a liquid crystal display, a touch panel and the like.

It is to be noted that, "transparent" herein means a transmittance of the light of the wavelength belonging to the visible light band (about 360 nm to 830 nm) is high, and for example, means that a transmittance of the light is equal to or greater than 70%.

Furthermore, the shape of the base material 40 is not particularly limited except that it has a plate shape, as illustrated in FIG. 2, and can be appropriately selected according to the purpose of use of the base material with anti-reflection structure 1.

Further, the application of the base material with anti-reflection structure 1 according to the present disclosure is not particularly limited, and it can be used as a dust-proof cover for video projection devices, such as camera modules, displays for mobile devices such as smartphones and tablet PCs, and head-up displays.

Among them, it is preferable that the base material with anti-reflection structure 1 is used as a component of the camera module. This is because the appearance, the anti-reflection performance and the transparency of the base material with anti-reflection structure 1 can be effectively exercised.

<Camera Module>

The camera module according to the present disclosure uses the above described base material with anti-reflection structure 1. By using the base material with anti-reflection structure 1, the anti-reflection performance and the transparency can be maintained at a high level.

It is to be noted that the camera module is not particularly limited except that it includes the base material with anti-reflection structure 1 as a component, and it may include other components as appropriate, according to the required performances, and the like. For example, the camera module may further include a light shielding film (not illustrated), in addition to the base material with anti-reflection structure 1.

The light-shielding film is a member that enhances the light-shielding property and blocks light from reaching the solid-state image sensor even when the thinned base material 40 transmits light, and can be provided on the base material 40.

A material constituting the light shielding film is not particularly limited, and a known light shielding film can be appropriately used depending on the use.

As a material of the light shielding film, for example, a composition for a light shielding film in which a binder resin contains light-shielding particles, a filler, other additives and the like can be used.

Examples of the binder resin include, for example, (meth) acrylic resin, urethane resin, polyvinyl alcohol, polyvinyl butyral, polyvinyl formal, polyamide, polyester, and the like, and include (meth)acrylic resin, urethane resin, and the like. These resins may have a carboxylic acid group, a sulfonate group, a phonic acid group, a phonic acid group, a sulfonamide group, and the like, as an acid group.

Examples of the light-shielding particles include, for example, inorganic pigment such as carbon black, titanium black, tungsten compound, zinc oxide, lead white, lithopon, titanium oxide, chromium oxide, iron oxide, precipitated barium sulfate and barite powder, red lead, red iron oxide, yellow lead, zinc yellow (zinc yellow type 1 and zinc yellow type 2), ultramarine blue, procyanide blue (potassium ferrocyanide), zircon gray, praseodymium yellow, chrome titanium yellow, chrome green, peacock, victorial green, iron blue (unrelated to Prussian blue), vanadium zirconium blue, chrome tin pink, manganese pink, salmon pink and the like. Further, as the black pigment, a metal oxide, a metal nitrogen, a mixture thereof, or the like containing one or more metal elements selected from the group consisting of Co, Cr, Cu, Mn, Ru, Fe, Ni, Sn, Ti, and Ag can be used.

Furthermore, the light-shielding particles may also include light-shielding dyes such as, for example, cyanine dyes, phthalocyanine dyes, naphthalocyanine dyes, immonium dyes, aminium dyes, quinolium dyes, pyrylium dyes, or metal complex dyes such as Ni complex dyes.

The content of the light-shielding particles in the light-shielding film composition is not particularly limited, but is preferably from 30 to 70 mass %, more preferably from 40 to 60 mass %, and still more preferably from 45 to 55 mass %, based on the total solid content.

Further, the composition for a light shielding film may contain fillers and other additives as necessary. The filler is not particularly limited as long as it increases the reflectance, and for example, an organic filler, an inorganic filler, or an inorganic-organic composite filler can be used.

Examples of the organic filler include, for example, synthetic resin particles, natural polymer particles, and the like, and preferably resin particles such as acrylic resin, polyethylene, polypropylene, polyethylene oxide, polypropylene oxide, polyethyleneimine, polystyrene, polyurethane, polyurea, polyester, polyamide, polyimide, carboxymethylcellulose, gelatin, starch, chitin, chitosan, and the like.

Examples of the inorganic filler include metals and metal compounds such as silica, mica compound, glass, zinc oxide, alumina, zircon oxide, tin oxide, potassium titanate, strontium titanate, aluminum borate, magnesium oxide, magnesium borate, aluminum hydroxide, magnesium hydroxide, calcium hydroxide, titanium hydroxide, basic magnesium sulfate, calcium carbonate, magnesium carbonate, calcium sulfate, magnesium sulfate, calcium silicate, magnesium silicate, calcium phosphate, silicon nitride, titanium nitride, aluminum nitride, silicon carbide, titanium carbide, zinc sulfide, and at least two or more of these compounds.

Examples of the above described other additives include known additives such as a polymerizable compound, a polymerization initiator, a dispersant, a sensitizer, a cross-linking agent effect accelerator, and a surfactant.

<Information Terminal Device>

The information terminal device according to the present disclosure is an information terminal device equipped with a camera module, wherein the camera module is the above described camera module according to the present disclosure.

According to the information terminal device of the present disclosure, when a still image or a moving image is taken, the reflection of light is suppressed, and the occurrence of color unevenness or the like can be suppressed in the obtained captured image. Further, since wrinkles do not occur on the surface of the anti-reflection structure 20 in the base material with anti-reflection structure 1, the transparency and color unevenness of the captured image are not worsened. As a result, a captured image with excellent visibility and image quality can be obtained.

Here, the information terminal device is not particularly limited, and examples thereof include a digital camera, a smartphone, a personal computer, a portable game machine, a television, and a video camera.

EXAMPLES

Next, the present disclosure will be explained in more detail on the basis of examples. However, the present disclosure is not limited in any manner to the following examples.

Examples 1 to 5 and Comparative Examples 1 to 5

As illustrated in FIG. 2, an adhesion layer 20 with the storage elastic modulus E'(MPa) illustrated in Table 1 and a thickness T1 of 9 μm was formed on the glass substrate ("slide glass S1127" from Matsunami Glass Industry Co., Ltd.) 40 with a thickness of 1.0 mm, then the anti-reflection layer 30 having a fine uneven structure was formed on the adhesion layer 20 to produce the base material with anti-reflection structure 1, which will be a sample of each Example and Comparative Example.

Here, for the anti-reflection layer 30, "UVX-6366" (hard-court resin with pentaerythritol tetraacrylate as a main ingredient) from TOAGOSEI Co., Ltd. and "M-240" (polyethylene glycol diacrylate) from TOAGOSEI Co., Ltd. were mixed in a ratio of 7:3, then a composition in which 2% by mass of "Irgacure 184" (1-Hydroxycyclohexylphenyl ketone) from BASF Co., which is an ultraviolet curing initiator, was added was molded. Then the composition was irradiated with UV light for 10 seconds using a flat excimer ("EX-400" from Hamamatsu Photonics K.K.) to form a film on which a fine uneven structure was formed. As illustrated in (a) of FIG. 5, for the anti-reflection layer 31, it was molded by using the molds 100 and 100' ("A4300PET film" from Toyobo Co., Ltd., thickness: 125 μm), and a Si film or an ITO film was formed, as the mold release layers 101 and 101'. The mold release layers 101 and 101' were formed between the mold 100 and the antireflection layer 31 and between the mold 100' and the antireflection layer 31, respectively, by sputtering. After that, a layer coated with a mold release agent ("Novec 1720" from 3M) was provided, and in that state, UV irradiation was performed. The resulting fine uneven structure of the anti-reflection layer 30 had an uneven period P of 190 nm, an uneven height H of 225 nm, and a thickness T2 of 1 μm.

Further, for the produced anti-reflection layer 31, as illustrated in (b) to (d) of FIG. 5, one side of the anti-reflection layer 31 was exposed ((b) of FIG. 5), then was crimped to the adhesive 21 (see Table 1 for material), and in that state, irradiated with UV light for 10 seconds using a flat excimer ("EX-400" from Hamamatsu Photonics K.K.) ((c) of FIG. 5). After that, unnecessary anti-reflection layer 31 was removed ((d) of FIG. 5). In this manner, the anti-reflection layer 30 was formed on the adhesion layer 20.

(Evaluation)

Each laminate sample obtained by Examples and Comparative Examples was evaluated as follows. Evaluation results are shown in Table 1.

(1) Storage Elastic Modulus of Adhesion Layer

For the storage elastic modulus of the material used for the adhesion layer of each sample, a sample piece having a thickness of 200 μm, a width of 5 mm and a length of 40 mm was produced under the same conditions as those of formation of the adhesion layer (using the same material and the same irradiating conditions of UV light), then the storage elastic modulus (MPa) at 40° C. was measured using a dynamic viscoelasticity measuring device ("DMS6100" from Hitachi High-Tech Science Co., etc.) under the conditions of frequency: 1 Hz, tensile force/compression force: 98 mN, temperature range: −50 to 200° C. Measurement results are shown in Table 1.

(2) Generation of Wrinkles

Each sample of base material with anti-reflection structure was produced, and was left at room temperature for 72 hours. After that, the surface of each sample was observed using an optical microscope (10 magnifications) and an optical microscope (a three-dimensional shape measuring instrument ("Vertscan" from Hitachi High-Tech Science Corporation) to check for wrinkles caused by cure and shrinkage of the anti-reflection layer. The results were evaluated according to the following criteria, and are shown in Table 1.

Pass: No generation of wrinkles caused by cure and shrinkage of the anti-reflection layer confirmed Fail: Generation of wrinkles caused by cure and shrinkage of the anti-reflection layer confirmed (3) Adhesion Between Adhesion Layer and Base Material After each sample of base material with anti-reflection structure was produced, whether the adhesive layer was adhered to the glass base material or not was checked visually and by the cross-cut method (JIS-K-5600). The results were evaluated according to the following criteria, and the evaluation results are shown in Table 1.

Pass: Adhesion at a level that does not cause problems as a product

Fail: No adhesion

TABLE 1

| Sample | | Comparative Example 1 | Comparative Example 2 | Comparative Example 3 | Example 1 | Example 2 |
|---|---|---|---|---|---|---|
| Type of adhesive *1 | | Adhesive 1 | Adhesive 2 | Adhesive 3 | Adhesive 4 | Adhesive 5 |
| Evaluation | Storage elastic modulus (MPa) | 1.7 | 5.3 | 3.9 | 119.5 | 25 |
| | Generation of wrinkles | Fail | Fail | Fail | Pass | Pass |
| | Adhesion to base material | Pass | Pass | Pass | Pass | Pass |

| Sample | | Comparative Example 4 | Example 3 | Example 4 | Example 5 | Comparative Example 5 |
|---|---|---|---|---|---|---|
| Type of adhesive *1 | | Adhesive 6 | Adhesive 7 | Adhesive 8 | Adhesive 9 | Adhesive 10 |
| Evaluation | Storage elastic modulus (MPa) | 3.3 | 592.8 | 63 | 2084 | 2151 |
| | Generation of wrinkles | Fail | Pass | Pass | Pass | Not measurable |
| | Adhesion to base material | Pass | Pass | Pass | Pass | Fail |

*1 For the components of adhesives 1-10, the following UV-curable resins were used.

Adhesive 1: "BU-333V" from TOAGOSEI Co., Ltd.

Adhesive 2: Mixture of "BU-333V" from TOAGOSEI Co., Ltd. and "M-305" from TOAGOSEI Co., Ltd. in a mass ratio of 95:5

Adhesive 3: "UVX-5800" from TOAGOSEI Co., Ltd.

Adhesive 4: "LCR-0632" from TOAGOSEI Co., Ltd.

Adhesive 5: Mixture of "LCR-0632" from TOAGOSEI Co., Ltd. and "M-5400" from TOAGOSEI Co., Ltd. in a mass ratio of 70:30

Adhesive 6: Mixture of "LCR-0632" from TOAGOSEI Co., Ltd. and "M-5400" from TOAGOSEI Co., Ltd. in a mass ratio of 50:50

Adhesive 7: "TB3021" from ThreeBond Co., Ltd.

Adhesive 8: "TB3042" from ThreeBond Co., Ltd.

Adhesive 9: "SA1110" from Dexerials Corporation

Adhesive 10: Mixture of "UVX-6366" from TOAGOSEI Co., Ltd. and "M-240" from TOAGOSEI Co., Ltd. in a mass ratio of 60:40

From Table 1, it can be seen that the samples of Examples 1 to 5 included in the scope of the present disclosure have no wrinkles on the surface and there is no problem with the adhesiveness between the base material and the adhesion layer.

INDUSTRIAL APPLICABILITY

According to the present disclosure, an anti-reflection structure and a base material with anti-reflection structure with excellent anti-reflection performance and transparency, and with reduced generation of wrinkles on the surface can be provided. Further, according to the present disclosure, by using the base material with anti-reflection structure, a camera module with excellent anti-reflection performance and transparency, and an information terminal device capable of obtaining a captured image having excellent visibility and image quality can be provided.

REFERENCE SIGNS LIST

1 Base material with anti-reflection structure
10 Anti-reflection structure
20 Adhesion layer
21 Adhesive
30, 31 Anti-reflection layer
40 Base material
100, 100' Mold
101, 101' Mold release layer
T1 Thickness of adhesion layer
T2 Thickness of anti-reflection layer
P Uneven period of fine uneven structure in anti-reflection layer
H Uneven height of fine uneven structure in anti-reflection layer

The invention claimed is:

1. An anti-reflection structure comprising at least an adhesion layer and an anti-reflection layer formed on the adhesion layer and having fine uneven structures on both sides thereof, wherein a storage modulus of the adhesion layer measured under the conditions of frequency: 1 Hz, tension/compression force: 98 mN, temperature range: −50 to 200° C. and measurement temperature: 40° C. is equal to or greater than 25 MPa (MegaPascal) and equal to or less than 2.1 GPa (GigaPascal), the fine uneven structures formed on both sides of the anti-reflection layer each have an uneven period equal to or less than a wavelength of visible light, and wherein a thickness T1 of the adhesion layer relative to a thickness T2 of the anti-reflection layer is from 5 to 300, in which the thickness T1 of the adhesion layer and the thickness T2 of the anti-reflection layer are the thicknesses T1 and T2 of thickness portions in a laminating direction.

2. The anti-reflection structure according to claim 1, wherein the adhesion layer is a layer made of an ultraviolet curable adhesive.

3. A base material with anti-reflection structure comprising a base material, an adhesion layer formed on the base material, and an anti-reflection layer formed on the adhesion layer and having fine uneven structures on both sides thereof, wherein a storage modulus of the adhesion layer measured under the conditions of frequency: 1 Hz, tension/compression force: 98 mN, temperature range: −50 to 200° C. and measurement temperature: 40° C. is equal to or greater than 25 MPa (MegaPascal) and equal to or less than 2.1 GPa (GigaPascal);

the fine uneven structures formed on both sides of the anti-reflection layer each have an uneven period equal to or less than a wavelength of visible light, and wherein a thickness T1 of the adhesion layer relative to a thickness T2 of the anti-reflection layer is from 5 to 300, in which the thickness T1 of the adhesion layer and the thickness T2 of the anti-reflection layer are the thicknesses T1 and T2 of thickness portions in a laminating direction.

4. A camera module that uses the base material with anti-reflection structure according to claim 3.

5. An information terminal device equipped with a camera module, wherein, as the camera module, the camera module according to claim 4 is used.

*   *   *   *   *